Patented July 24, 1934

1,967,829

UNITED STATES PATENT OFFICE 1,967,829

ADHESIVE AND FILM FORMING COMPOSITION

Paul C. Lemmerman, East Cleveland, and Raymond F. Remler, Rocky River, Ohio, assignors to The Grasselli Chemical Company, Cleveland, Ohio, a corporation of Delaware No Drawing. Application October 14, 1932, Serial No. 637,776

3 Claims. (Cl. 87—17)

The present invention relates to adhesive and film forming compositions consisting of alkali metal silicate solutions containing a small amount of the acetic acid radical.

It is well known that the addition of non-caustic electrolytes, such as salts or acids, to silicate solutions precipitates silicic acid therefrom. We have found that relatively small amounts of acetic acid or a water soluble acetate are compatible with sodium or potassium silicate solutions and that the small amounts of the acetate radical introduced thereby into the silicate solution greatly modifies the physical properties thereof.

The amounts of acetate radical compatible with the silicate solution depends to a certain extent upon the concentration and composition of the silicate solution. The silicate solutions useful for adhesive and film forming purposes usually range within the compositions of $1.5SiO_2:1Na_2O$ and $3.5SiO_2:1Na_2O$. In concentrations above 15° Bé. and compositions within these ranges the upper limits of compatible amounts of the acetate radical are between 1 and 3% of the weight of the solution.

The introduction of the acetate radical into a sodium silicate solution can be effected by addition of the requisite amount of acetic acid or a soluble acetate.

In the case of additions of free acetic acid in compatible amounts it is advisable to use somewhat dilute acid and to introduce this slowly with good agitation of the silicate. We also prefer to proceed at elevated temperature going even to the extent of heating the acid at temperatures above 100° C. and under super atmospheric pressure. Under such conditions no precipitation of silicic acid takes place which might or might not redissolve in the silicate. The addition of acetic acid does not modify the ratio of total $SiO_2:Na_2O$ of the original silicate.

No particular precautions are necessary for the addition of a soluble acetate such as sodium, ammonium potassium acetate, etc. to a silicate solution.

It is, of course, understood that on addition of acetic acid to a sodium silicate solution within the above range of compositions useful for adhesive and film forming compositions the acid will react with the excess caustic to form sodium acetate and in respect to final result the addition of free acetic acid or of a soluble silicate will be entirely equivalent. In the case of additions of acetate within the amounts contemplated, i. e. to produce a solution containing compatible amounts of the acetate radical (for instance up to 3%) the alkali introduced by the acetate does not materially affect the $SiO_2:Na_2O$ ratio.

The physical properties modified by the presence of the acetate radical are increased viscosity and higher jelling point of the modified silicate compared with a silicate of the same concentration and total $SiO_2:Na_2O$ ratio.

Another very important property of the silicate solution is modified by the presence of the acetate radical, this relates to the setting time of a film produced by spreading out such a solution and this time is considerably shorter in the case of the acetate modified solution.

The following tables illustrate these properties of the acetate modified silicate solutions. It is noted that an arbitrary unit is used for the viscosity as determined by the Stormer Viscosimeter, 1 being practically the viscosity of commercial silicate solutions of a 33° Bé. 3.25:1 ratio silicate solution. Figures greater than 1 mean a greater viscosity and figures below 1 indicate less viscous solutions. These gravities have been determined at 78° F. unless noted otherwise.

It is also noted that ordinary silicate solutions get gradually viscous on cooling finally becoming almost solid, whereas acetate modified silicates jell sharply, becoming solid without further temperature change once the jelling starts.

*Table 1*

Relation between acetate content, viscosity and jelling point of a 33° Bé. sodium silicate solution of a composition 3.25 $SiO_2$:1 total $Na_2O$.

| Acetate, $C_2H_3O_2$ content | Stormer viscosity | Solidification temperature in °F. |
|---|---|---|
| ---- | 0.95 | 26 |
| 0.26 | 1.00 | 27 |
| 0.49 | 1.05 | 27 |
| 0.78 | 1.16 | 29 |
| 1.01 | 1.31 | 39 |
| 1.19 | 3.95 | 55 |
| 1.45 | Pasty. | 95 |

*Table 2*

Same relations as in Table 1 for a silicate solution of the same composition but a specific gravity of 34° Bé.

| Acetate, $C_2H_3O_2$ content | Stormer viscosity | Solidification temperature in °F. |
|---|---|---|
| 1.04 | 2.20 | 44 |
| 1.22 | 29.5 | 60 |

*Table 3*

Comparison of the viscosities of a straight sodium silicate solution of a ratio 3.25 $SiO_2$:1 total $Na_2O$, at different temperatures and gravities with a solution of the same ratio but containing 1.08% acetate radical.

| Temperature in °F. | Straight silicate solutions | | Solutions containing 1.08% acetate | |
|---|---|---|---|---|
| | Viscosity at gravity of— | | Viscosity at gravity of— | |
| | 30° Bé. | 32° Bé. | 30° Bé. | 32° Bé. |
| 40 | 0.90 | 1.30 | 4.83 | Solid. |
| 60 | 0.80 | 1.00 | 0.97 | 12.37 |
| 80 | 0.73 | 0.92 | 0.82 | 1.75 |
| 100 | 0.68 | 0.85 | 0.73 | 1.11 |
| 120 | 0.63 | 0.78 | 0.68 | 0.92 |

*Table 4*

Setting time of films of silicate solutions containing various amounts of the acetate radical at room temperature.

| Acetate content % | Gravity in °Bé. | Setting time in minutes |
|---|---|---|
| None. | 36 | 47 |
| 0.74 | 36 | 28 |
| 0.98 | 36 | 20 |
| 1.48 | 34 | 19 |

Entirely similar changes are observed in acetate modified silicate solutions of different composition. The present invention is also applicable to potassium silicate solutions where additions of the acetate radical produce similar changes in the viscosity, jelling point of the solutions and setting time of films produced therefrom.

These novel properties render our composition useful in many instances where quick setting of an adhesive is required or where viscous solutions of relatively low concentration are required; when porous materials are desired to be joined there is often a drawback noted in the use of ordinary straight silicate solutions as they tend to penetrate into the material and it was found that the strongly alkaline silicate is very often detrimental to the material. This is particularly the case with chip board which is commonly used with sodium silicate as the adhesive for the manufacture of corrugated board. The alkaline silicate produces discoloration of the board and attacks the size; with our novel compositions the increased viscosity and quicker setting counteracts the penetration and less discoloration is noticed when these compositions are used as an adhesive.

This application is a continuation in part of our application Ser. No. 495,418, filed Nov. 13, 1930, now Patent No. 1,899,576. The addition of the acetate radical to silicate solutions without a precipitation of silica, herein disclosed, is disclosed in the said application in connection with an improved coating for protecting concrete surfaces during curing.

We claim:

1. As an adhesive and film forming composition an aqueous solution of an alkali metal silicate containing an amount of the acetate radical not exceeding 3% of the weight of the solution.

2. As an adhesive and film forming composition an aqueous sodium silicate solution containing an amount of the acetate radical not exceeding 3% of the weight of the solution.

3. As an adhesive and film forming composition an aqueous sodium silicate solution of a composition within the range of 1.5 $SiO_2$:1 total $Na_2O$ and 3.5 $SiO_2$:1 total $Na_2O$ and of a concentration above 15° Bé., containing an amount of the acetate radical not exceeding 3% of the weight of the solution.

PAUL C. LEMMERMAN.
RAYMOND F. REMLER.